US009532369B2

(12) United States Patent
Susitaival et al.

(10) Patent No.: US 9,532,369 B2
(45) Date of Patent: Dec. 27, 2016

(54) DYNAMIC CONFIGURATION OF SUBFRAMES IN A RADIO COMMUNICATIONS SYSTEM

(75) Inventors: Riikka Susitaival, Helsinki (FI); David Astely, Bromma (SE); Erik Eriksson, Linköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 69 days.

(21) Appl. No.: 14/385,536

(22) PCT Filed: Mar. 22, 2012

(86) PCT No.: PCT/SE2012/050322
§ 371 (c)(1),
(2), (4) Date: Sep. 16, 2014

(87) PCT Pub. No.: WO2013/141770
PCT Pub. Date: Sep. 26, 2013

(65) Prior Publication Data
US 2015/0043392 A1 Feb. 12, 2015

(51) Int. Cl.
*H04W 72/12* (2009.01)
*H04W 72/04* (2009.01)
*H04L 5/14* (2006.01)

(52) U.S. Cl.
CPC ........ *H04W 72/1205* (2013.01); *H04L 5/1469* (2013.01); *H04W 72/0446* (2013.01)

(58) Field of Classification Search
CPC ..................... H04W 72/1205; H04W 72/0446; H04L 5/1469
See application file for complete search history.

(56) References Cited

U.S. PATENT DOCUMENTS

| 7,986,681 B2* | 7/2011 | Astely | H04B 7/2656 370/252 |
| 2008/0137562 A1* | 6/2008 | Li | H04B 7/2656 370/280 |

(Continued)

FOREIGN PATENT DOCUMENTS

WO 2012/019348 A1 2/2012

OTHER PUBLICATIONS

CATT, "Design of TDD Inter-band Carrier Aggregation," 3GPP TSG RAN WG1 Meeting #66bis, R1-112944, Agenda Item 7.2.1.5.2, Oct. 10-14, 2011, Zhuhai, China, 6 pages.

(Continued)

*Primary Examiner* — Chi H Pham
*Assistant Examiner* — Weibin Huang
(74) *Attorney, Agent, or Firm* — Patents on Demand, P.A.; Brian K. Buchheit; Scott M. Garrett

(57) ABSTRACT

The technology disclosed provides the ability for a subframe to be dynamically configured in time division duplex (TDD) communications between a UE radio terminal and a radio network node. A frame structure includes one or more subframes preconfigured as a downlink subframe, one or more subframes preconfigured as an uplink subframe, and one or more dynamically configurable subframes. Each dynamically configurable subframe includes a guard time period and at least a downlink part for transporting a dynamically configurable amount of downlink information, and in some embodiments, uplink information. A configuration for dynamically configurable subframes is determined for transmission and/or reception between the UE radio terminal and the radio network node.

23 Claims, 12 Drawing Sheets

(56) References Cited

U.S. PATENT DOCUMENTS

| | | | |
|---|---|---|---|
| 2008/0144530 A1* | 6/2008 | Che | H04B 7/2656 370/254 |
| 2008/0304404 A1* | 12/2008 | Lu | H04L 1/0625 370/210 |
| 2009/0125363 A1 | 5/2009 | Frederiksen et al. | |
| 2010/0303013 A1 | 12/2010 | Khandekar et al. | |
| 2011/0176461 A1 | 7/2011 | Astely et al. | |

OTHER PUBLICATIONS

International Search Report and Written Opinion for PCT/SE2012/050322, mailed Sep. 7, 2012, 13 pages.
Written Opinion of the International Preliminary Examining Authority for PCT/SE2012/050322, mailed Mar. 28, 2014, 8 pages.
International Preliminary Report on Patentability for PCT/SE2012/050322, mailed Jun. 25, 2014, 20 pages.

* cited by examiner

DYNAMIC CONFIGURATION OF SUBFRAMES IN A RADIO COMMUNICATIONS SYSTEM

This application is a 35 U.S.C. §371 national phase filing of International Application No. PCT/SE2012/050322, filed Mar. 22, 2012, the disclosure of which is incorporated herein by reference in its entirety.

BACKGROUND

The technology pertains to telecommunications, and particularly, to a frame structure and a method and apparatus for dynamically configuring a frame structure.

In a typical cellular radio system, radio or wireless terminals (also known as mobile stations, user equipment units (UEs), UE radio terminals, UE terminals, etc.) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS), "eNodeB" (LTE), or more generally a radio network node. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. Release 10 for the Evolved Universal Terrestrial Radio Access Network (E-UTRAN) specification has issued recently, and as with most specification, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network rather than to radio network controller (RNC) nodes. In general, in LTE the functions of a radio network controller (RNC) node are distributed between the radio base stations nodes (eNodeB's in LTE). As such, the radio access network (RAN) of an LTE system has what is sometimes termed a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), as illustrated to the left in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD can operate in unpaired frequency spectrum, whereas FDD requires paired frequency spectrum.

Typically, a transmitted signal in a communication system is organized in some form of frame structure. For example, LTE uses ten equally-sized subframes 0-9 of length 1 msec per radio frame as illustrated in FIG. 2.

In the case of FDD operation (illustrated in the upper part of FIG. 2), there are two carrier frequencies, one for uplink transmission ($f_{UL}$) and one for downlink transmission ($f_{DL}$). At least with respect to the radio terminal in a cellular communication system, FDD can be either full duplex or half duplex. In the full duplex case, a terminal can transmit and receive simultaneously, while in half-duplex operation (see FIG. 1), the terminal cannot transmit and receive simultaneously (although the base station is capable of simultaneous reception/transmission, i.e., receiving from one terminal while simultaneously transmitting to another terminal). In LTE, a half-duplex radio terminal monitors/receives in the downlink except when explicitly instructed to transmit in the uplink in a certain subframe. FDD half-duplex operation is specified in the 3GPP MAC specification TS 36.321.

In the case of TDD operation (illustrated in the lower part of FIG. 2), there is only a single carrier frequency, and uplink and downlink transmissions are separated in time. Because the same carrier frequency is used for uplink and downlink transmission, both the base station and the mobile terminals need to switch from transmission to reception and vice versa. An important aspect of a TDD system is to provide a sufficiently large guard time where neither downlink nor uplink transmissions occur in order to avoid interference between uplink and downlink transmissions. For LTE, "special" subframes (subframe 1 and, in some cases, subframe 6) provide this guard time. A TDD special subframe is split into three parts: a downlink part (DwPTS), a guard period (GP), and an uplink part (UpPTS). The remaining subframes are either allocated to uplink or downlink transmission. The DwPTS part of the special subframe is used for Physical Downlink Control Channel (PDCCH) and Physical Downlink Shared Channel (PDSCH) transmission, whereas the UpPTS part is used only for random access preamble transmission on Physical Random Access Channel (PRACH), and for sounding, i.e., sounding reference signals (SRS).

Time division duplex (TDD) allows for different asymmetries in terms of the amount of resources allocated for uplink and downlink transmission, respectively, by means of different downlink/uplink configurations. In LTE, there are seven different configurations as shown in FIG. 3. The configurations cover a wide range of allocations from an uplink heavy DL:UL ratio 2:3 (Configuration 0) to a downlink heavy DL:UL ratio 9:1 (Configuration 5). These configurations are referred to in examples below.

The required length of the guard period depends on the network deployment, cell sizes, etc. As a result, 3GPP specifies 11 different special subframe configurations. The special subframe configuration defines how 14 symbols of the subframe are divided between the downlink part (DwPTS), the uplink part (UpPTS), and the guard period (GP). The specified special subframe configurations are depicted in Table 1 below. The TDD configuration as well as the 3GPP "special" subframe configuration are signaled to the UEs on a broadcast channel as a part of System Information Block 1. In a handover scenario, use of dedicated radio resource control (RRC) signaling is also possible.

TABLE 1

| Configuration | DwPTS | Guard period | UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |

To avoid significant interference between downlink and uplink transmissions between different cells, neighbor cells should have the same downlink/uplink configuration. Otherwise, uplink transmission in one cell may interfere with downlink transmission in the neighboring cell (and vice versa) as illustrated in FIG. 4, where the uplink transmission of the UE in the right cell is interfering with the downlink reception by the UE in the left cell. As a result, the downlink/uplink asymmetry can typically not vary between cells. However, there might some special deployments, e.g., with isolated cells, where the interference is not a problem, and thus, a different TDD configuration in neighboring cells is possible. But the downlink/uplink asymmetry configuration signaled as part of the system information remains fixed for a long period of time with existing mechanisms.

Existing TDD networks typically use a fixed configuration where some subframes are uplink and some are downlink. This limits the flexibility in adopting the uplink/downlink asymmetry to varying traffic situations.

One possibility to increase the flexibility of a TDD system, at least in some scenarios, is disclosed in commonly-assigned U.S. patent application Ser. No. 12/816,821 and summarized here. Each subframe (or part of a subframe) belongs to one of three different types: downlink, uplink, and a new type called "flexible." A downlink subframe is used (among other things) for transmission of downlink data, system information, control signaling, and hybrid-ARQ feedback in response to uplink transmission activity. For example, in LTE Rel-8, the UE monitors the physical dedicated control channel (PDCCH) subframes for scheduling assignments and scheduling grants. Uplink subframes are used (among other things) for transmission of uplink data, uplink control signaling (e.g., channel-status reports), and hybrid-ARQ feedback in response to downlink data transmission activity. For example, in LTE Rel-8, data transmission on the physical uplink shared channel (PUSCH) in uplink subframes is controlled by uplink scheduling grants received on a PDCCH in an earlier downlink subframe. "Flexible" subframes described in the commonly-assigned U.S. patent application Ser. No. 12/816,821, which are not 3GPP "special" subframes, may be used for uplink or downlink transmissions. The flexible subframe is used to select a particular communication direction (uplink or downlink).

In the commonly-assigned U.S. patent application Ser. No. 12/816,821, a semi-static configuration is used to assign one of the above three types to each subframe as illustrated in FIG. 5. For example, semi-static configuration means, in a non-limiting LTE context, configuration by a medium access control (MAC) control element (CE), RRC, or a specific radio network temporary identifier (RNTI) on a PDCCH, and may for example be part of the system information either by explicitly indicating "UL", "DL", or "flexible," or by signaling "DL" and "UL" using an existing signaling message and then introduce an additional signaling message, understandable by new radio UE terminals only, where some subframes are identified as flexible. From a UE perspective, flexible subframes may be treated in a similar way as DL subframes unless the UE has been instructed to transmit in a particular flexible subframe. In other words, flexible subframes not assigned for uplink transmission from a particular UE may be treated as a DL subframe. If the control signaling contains an uplink scheduling grant valid for a later subframe, then the UE will transmit in the uplink using one or more flexible subframes.

In addition to downlink assignments and uplink scheduling grants, other types of control signaling should be considered. Of particular interest are hybrid-ARQ (HARQ) acknowledgement messages (could be positive or negative) transmitted in one direction in response to data transmission in the other direction. As an example, when the UE in LTE receives a data transmission in a particular subframe from the eNodeB, it will, at a predetermined time, transmit a hybrid-ARQ acknowledgement informing the eNodeB whether the data transmission was successful or not. Commonly-assigned U.S. patent application Ser. No. 12/816,821 proposes to transmit feedback signaling only in an uplink or downlink subframe and not in flexible subframes.

Dynamic TDD is further extended in commonly-assigned U.S. patent application Ser. No. 12/945,554, filed on Nov. 12, 2010, the contents of which are incorporated herein by reference. Here, the UE uses primary and secondary TDD configurations to determine if the subframe is a DL, UL, or flexible subframe. FIG. 5 illustrates a non-limiting example radio frame that includes downlink, uplink, and flexible subframes. The primary TDD configuration may have more UL subframes than the secondary TDD configuration. U.S. patent application Ser. No. 12/945,554 also proposes in one embodiment that the timing of UL HARQ follows one TDD configuration (primary configuration) with the timing of DL HARQ following another configuration (secondary configuration). FIG. 6 is a non-limiting example illustrating HARQ feedback timing according to a secondary TDD configuration compared to a primary TDD configuration. UEs that do not support dynamic TDD must follow the primary TDD configuration because in this configuration, all flexible subframes are UL subframes, and a subframe cannot dynamically change from DL to UL direction, which would disturb reception of reference signals.

A desirable goal is to permit legacy UEs to continue to access radio networks that include technical features that the legacy UEs are not configured to utilize. For example, legacy UEs should be able to receive reference symbols and make measurements in any subframe that these legacy UEs consider downlink subframes. If the network omits transmission of reference symbols during a particular flexible downlink subframe, and the legacy UEs are not aware of this, the result can be disturbed link quality measurements and potentially unnecessary handovers to neighboring cells.

In the above-referenced patent applications, backwards compatibility is achieved by configuring legacy UEs with the legacy TDD configuration in such a way that all flexible subframes are UL subframes. In this way, legacy UE measurements are not disturbed because reference symbols (RS) will not be transmitted in UL subframes. Because legacy UEs can be configured only with legacy TDD configurations (presented in FIG. 3), the maximum amount of UL resources that can be allocated in the above example using dynamic TDD in this context corresponds to TDD Configuration 0 with 6 out of 10 subframes. But in some cases, a large amount of UL resources may be desirable to offload uplink traffic spikes. Furthermore, UEs in a bad coverage area may be power-limited making it difficult even sustain low bitrates. UEs in this situation would benefit from a larger allocation of UL subframes because the available uplink transmission time is longer.

In current 3GPP specifications, a "special" subframe configuration is signaled to UEs in a semi-static manner in broadcasted System Information. Although there is a need to be able to change the guard period of the special subframe dynamically, even within a radio frame, it currently is not possible to adapt the special subframe configuration dynamically. This means that the guard period needs to be semi-statically dimensioned to long enough to accommodate a worst scenario, resulting capacity loss, and when a change is needed, there is an associated delay due to the need for reconfiguration.

One example where the needed guard period may change rapidly is when there is interference from a remote base station (BS) via an atmospheric duct. The presence of such interference is often time-varying and may require an increased guard period. In the 3GPP specifications today, the guard period can be increased by decreasing the duration of the downlink part of the special subframe, DwPTS, but the challenge with this approach is the need to change the guard period not only in the local base station that suffers from the interference (i.e., DL/UL radio channel reciprocity causes interference to the remote base station) but also in the remote base station. A problem in this situation is that it is typically not known which remote base station is causing the interference, and even though the radio channel itself is reciprocal in the uplink and downlink directions, the interference is not necessarily reciprocal because it depends on traffic load and on transmit power.

An alternative approach that can be implemented in a distributed fashion is to increase the guard period by effectively shortening the uplink period. For uplink data transmission, this shortening can be accomplished by not granting uplink transmissions in the first uplink subframe after a guard period. But due to predefined timing relations between the uplink and downlink, uplink control signaling can not be removed from the first uplink subframe. This also means that when there is interference in the uplink, the downlink performance is also adversely affected since control information such as HARQ ACK associated with one or typically several downlink subframes are transmitted in the first subframe.

The technology in this application solves these and other problems.

SUMMARY

One aspect of the technology relates to a radio network node for use in a radio communications network that uses time division duplex (TDD) to communicate with user equipment (UE) radio terminals. A frame structure includes one or more subframes preconfigured as a downlink subframe, one or more subframes preconfigured as an uplink subframe, and one or more dynamically configurable subframes. Each dynamically configurable subframe includes a guard time period and at least a downlink part for transporting a dynamically configurable amount of downlink information. A configuration is determined for one or more dynamically configurable subframes, and information is transmitted in downlink parts of the one or more dynamically configurable subframes.

In one example embodiment, one or more of the dynamically configurable subframes includes an uplink part for transporting a variable amount of uplink information. A configuration for the one or more dynamically configurable subframes may then be determined that includes an uplink part, and the radio network node may receive an uplink part of the dynamically configurable subframe transmitted by the UE.

In one example implementation, hybrid automatic repeat request, HARQ, feedback timing is determined in response to data transmission in the uplink part of the dynamically configurable subframe.

Another example implementation transporting uplink information in the dynamically configurable subframe includes uplink data information but not control information.

In addition, the dynamically configurable subframe has two formats: a downlink format and an uplink format. The downlink format has more downlink resources than the uplink format. An uplink/downlink format of the dynamically configurable subframe may then be determined, and an amount of uplink resources and/or downlink resources may be dynamically changed on an individual subframe basis for the dynamically configured subframe based on the determined uplink/downlink format.

Another aspect of the technology relates to a user equipment (UE) radio terminal communicating with a radio network node using subframes in a radio communications network that uses time division duplex (TDD) communications. A frame structure includes one or more subframes preconfigured as a downlink subframe, one or more subframes preconfigured as an uplink subframe, and one or more dynamically configurable subframes. Each dynamically configurable subframe includes a guard time period and at least a downlink part for transporting a dynamically configurable amount of downlink information. A configuration for one or more dynamically configurable subframes is determined. Information is received in a downlink part of a dynamically configurable subframe at a receiver.

In one example embodiment of the UE radio terminal, one or more of the dynamically configurable subframes includes an uplink part for transporting a variable amount of uplink information. A configuration is determined for the one or more dynamically configurable subframes that includes an uplink part. In one example implementation, the uplink information transported in the uplink part of the dynamically configurable subframe includes uplink data information but not control information.

As with the radio network node, the dynamically configurable subframe may, in one example embodiment, have a downlink format and an uplink format with the downlink format having more downlink resources than the uplink format. In this case, an uplink/downlink format of the dynamically configured subframe may be determined, and an amount of uplink resources and/or downlink resources dynamically changed on an individual subframe basis for the dynamically configured subframe based on the determined uplink/downlink format.

In one example implementation, the radio network is an LTE network, and wherein the dynamically configurable subframe is an enhancement of the special subframe in LTE. And preferably, the dynamically configurable subframe is backwards compatible with legacy UEs not capable of processing the dynamically configurable subframe.

DETAILED DESCRIPTION

Figure 1:
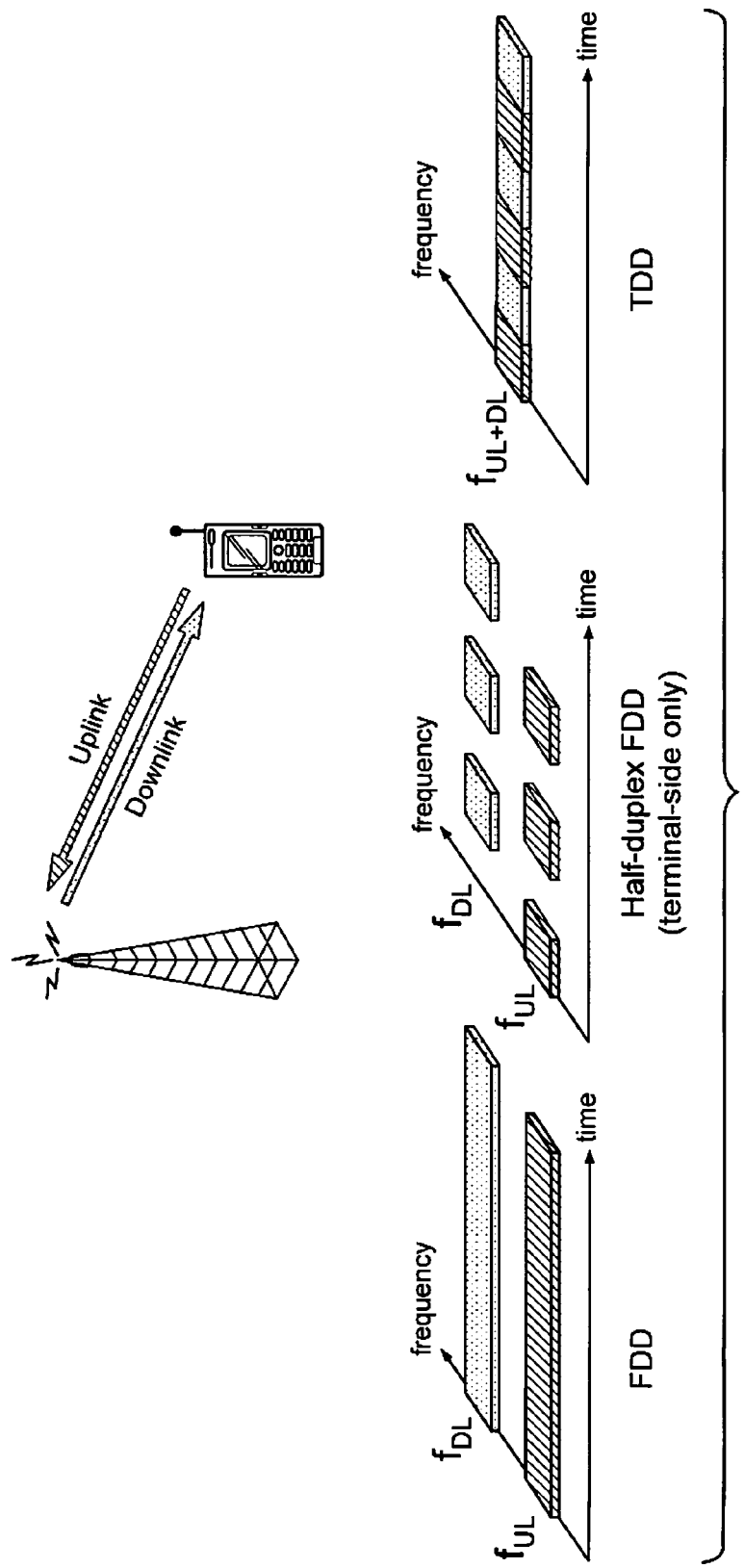
FIG. 1 illustrates frequency division duplex, half-duplex frequency division, and time division duplex transmissions.
Figure 2:
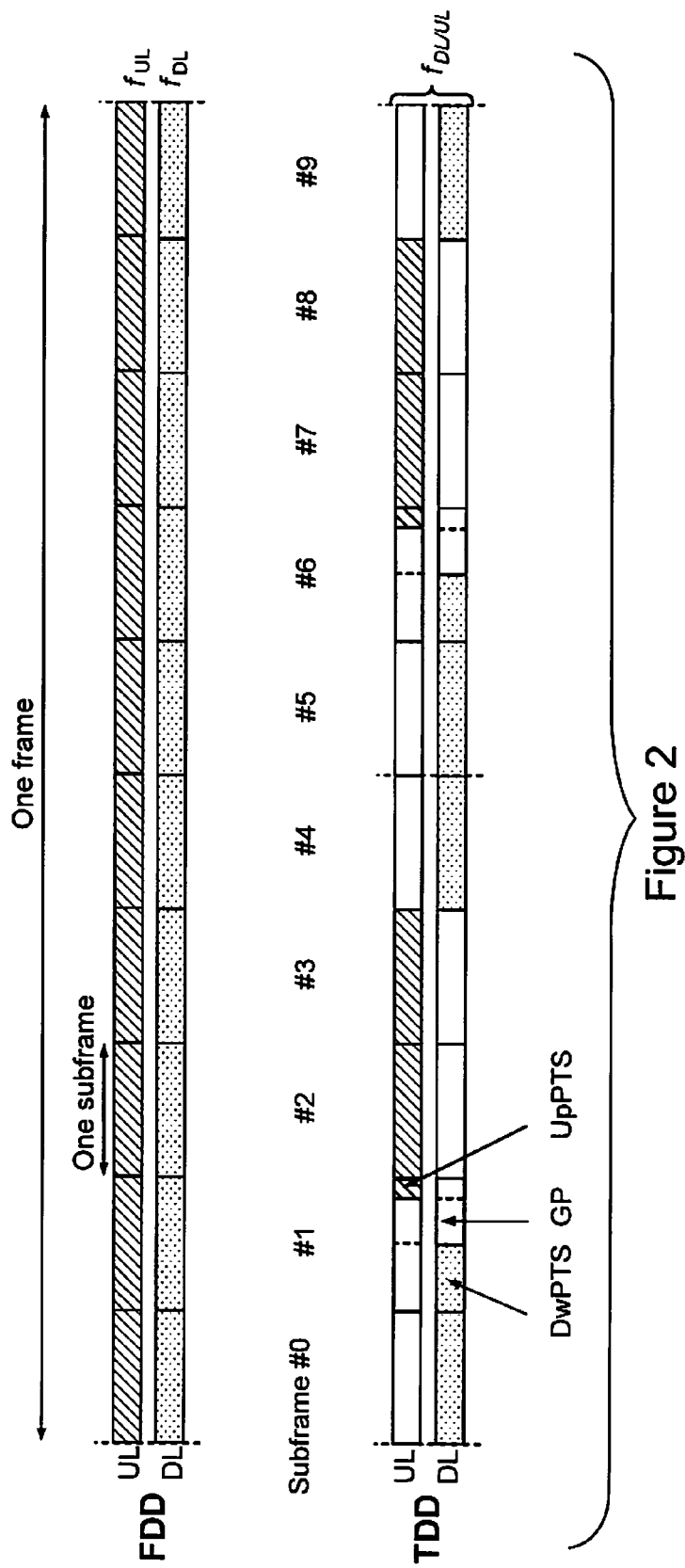
FIG. 2 illustrates uplink/downlink time/frequency structure for LTE separately in the case of frequency division duplex (FDD) and time division duplex (TDD).

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors and/or controllers, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

The technology in this application provides dynamically configurable subframes in addition to traditional downlink and uplink subframes. A dynamically configurable subframe includes a downlink part, an uplink part, and a guard part. This technology is advantageous for example in time division duplex (TDD) based systems. A dynamically configurable guard subframe downlink format and a dynamically configurable guard subframe downlink format are both described.

The technology described in this application is based on a dynamically configurable subframe for TDD communications that increases the amount of uplink (UL) and/or downlink (DL) radio communication resources available during that subframe, provides dynamic flexibility in UL-DL resource allocation sharing, and provides the possibility to adapt the length of guard period dynamically based on varying interference situation. The dynamically configurable subframe may be adapted depending on capacity needs in the uplink and/or downlink. Radio resources are preferably created for uplink data transmission in the dynamically configurable subframe, but preferably not for uplink control signaling in order to provide robustness with respect to remote base station interference. In one example embodiment, no lower communications protocol layer (e.g., L1/L2) control signaling is transmitted in uplink resources of the dynamically configurable subframes. The technology is also backward compatible for legacy UEs for which the dynamically configurable subframes are viewed as normal subframes (e.g., normal special subframes in 3GPP) configured using legacy radio resource allocations, e.g., having a maximum guard period and minimum downlink and uplink parts currently available.

For UEs supporting dynamically configurable subframes, e.g., enhanced special subframes in LTE, the dynamically configurable subframe can appear in one or both of two formats: a DL direction format and an UL direction format. The format of a dynamically configurable subframe may be changed dynamically on a per subframe basis if desired or on a less frequent basis. Although both downlink and uplink formats are described and both can be dynamically configured, both need not be configured for operation.

The following description is provided in the non-limiting and example context of an LTE-based example. In that example context, the dynamically configurable subframe is sometimes referred to as an enhanced special subframe in keeping with the nomenclature used in the 3GPP specifications. But those skilled in the art appreciate that the technology may be applied to any communications system where dynamically configurable communications resources in subframes are useful.

Figure 7:
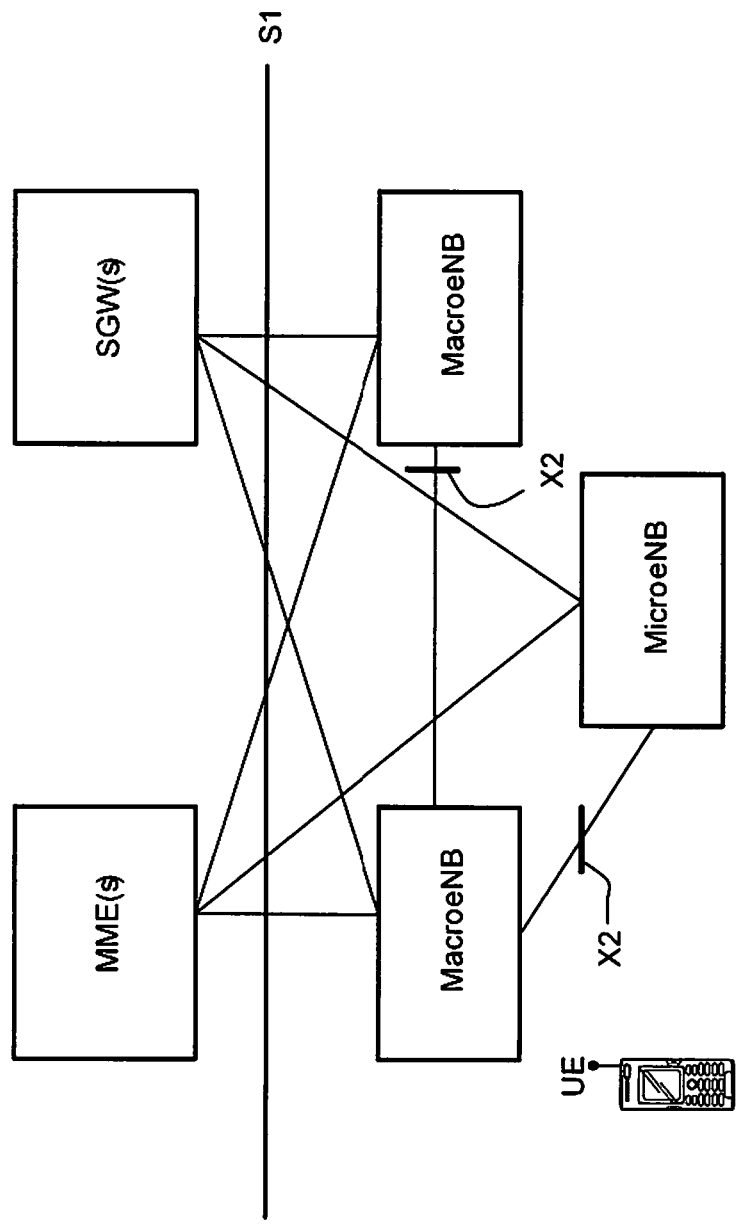
FIG. 7 is a non-limiting example function block diagram of an LTE cellular communications network in which dynamically configurable guard subframes such as enhanced special subframes may be used.

FIG. 7 shows an example diagram of an LTE-based communications system. The core network nodes include one or more Mobility Management Entities (MMEs), a key control node for the LTE access network, and one or more Serving Gateways (SGWs) which route and forward user data packets while and acting as a mobility anchor. They communicate with base stations, referred to in LTE as eNBs, over an S1 interface. The eNBs can include macro and micro eNBs that communicate over an X2 interface.

Figure 8:
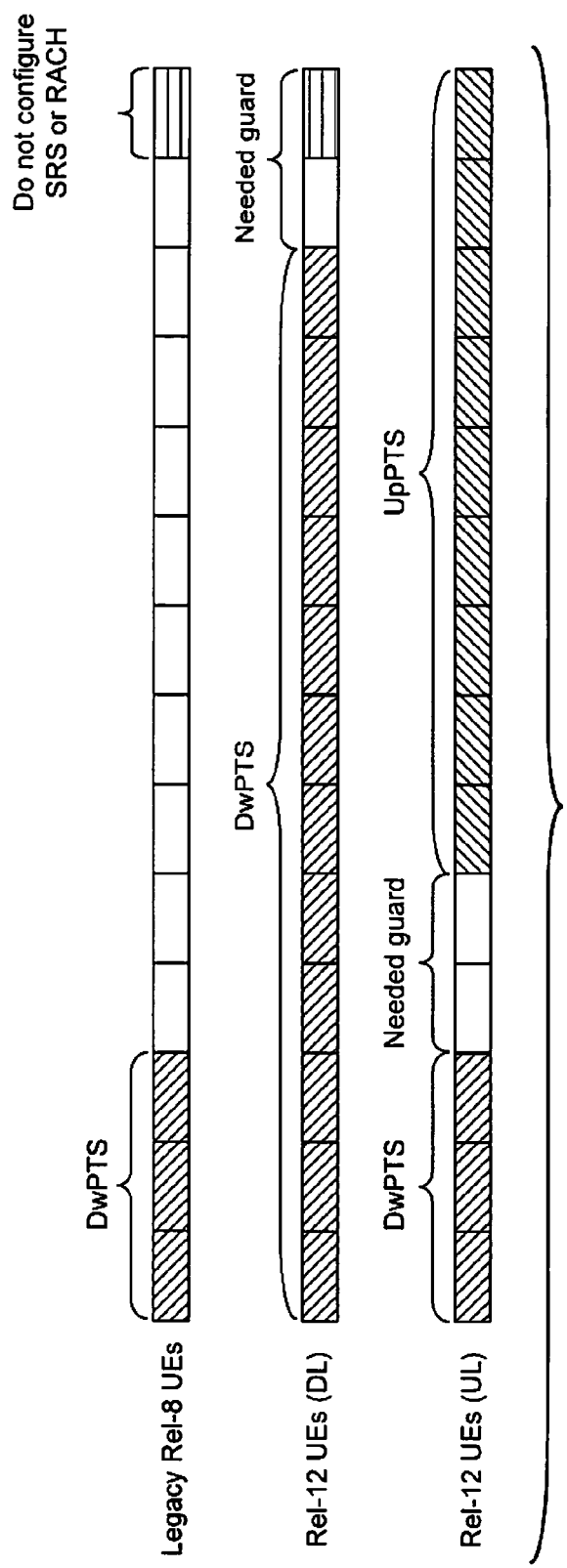
FIG. 8 is a non-limiting example of special and enhanced special subframe formats.

LTE-based examples of subframes including at least one guard time period are depicted in FIG. 8, where each rectangular block in a subframe represents a symbol period. FIG. 8 shows one of the existing LTE TDD special subframe configurations having a long guard period at the top of the figure. Legacy UEs (LTE Rel-8 UEs in this non-limiting example) are configured semi-statistically with this special subframe configuration with three symbol periods being allocated to DwPTS (a downlink part in LTE) and one symbol being allocated to SRS or RACH at the end. Beneath that are non-limiting examples of a dynamically configurable ("enhanced special" in LTE) downlink (DL) subframe format and a dynamically configurable ("enhanced special" in LTE) uplink (UL) subframe format for new LTE release Rel-12 or later release. The dynamically configurable DL subframe provides a configurable downlink part that can transport more downlink information that the legacy special subframe as is shown in the illustrated example. The dynamically configurable DL subframe contains also a configurable guard part and potentially a shorter, configurable uplink part. Likewise, the dynamically configurable uplink subframe provides a shorter, configurable downlink part in the beginning of the subframe, a configurable guard part, and a configurable uplink part. The downlink part allows legacy UEs to receive reference symbols. The uplink part can transport uplink data, in addition to signaling, which is not possible in the legacy special subframe.

In the examples in FIG. 8, the dynamically configurable subframe downlink part is labeled DwPTS, and the uplink part is labeled UpPTS as in the current 3GPP specifications. The DwPTS part may be used to transport data and/or control information, and the UpPTS part may be used to transport uplink data, control, random access, and/or reference information. As mentioned above, the dynamically configurable subframe can have two different modes: the dynamically configurable DL subframe and the dynamically configurable UL subframe. The first mode has more DL resources as compared to the second mode. The mode of the dynamically configurable subframe (DL/UL) can be changed dynamically on subframe basis.

In order to avoid a negative impact on legacy UEs, these new dynamically configurable subframes are configured so that the legacy UE DwPTS (DL part in LTE) of three symbols in FIG. 8 does not overlap with the dynamically configurable UL/DL area of the dynamically configurable subframe, e.g., symbols 4-14 in FIG. 8.

Figures 9, 10:
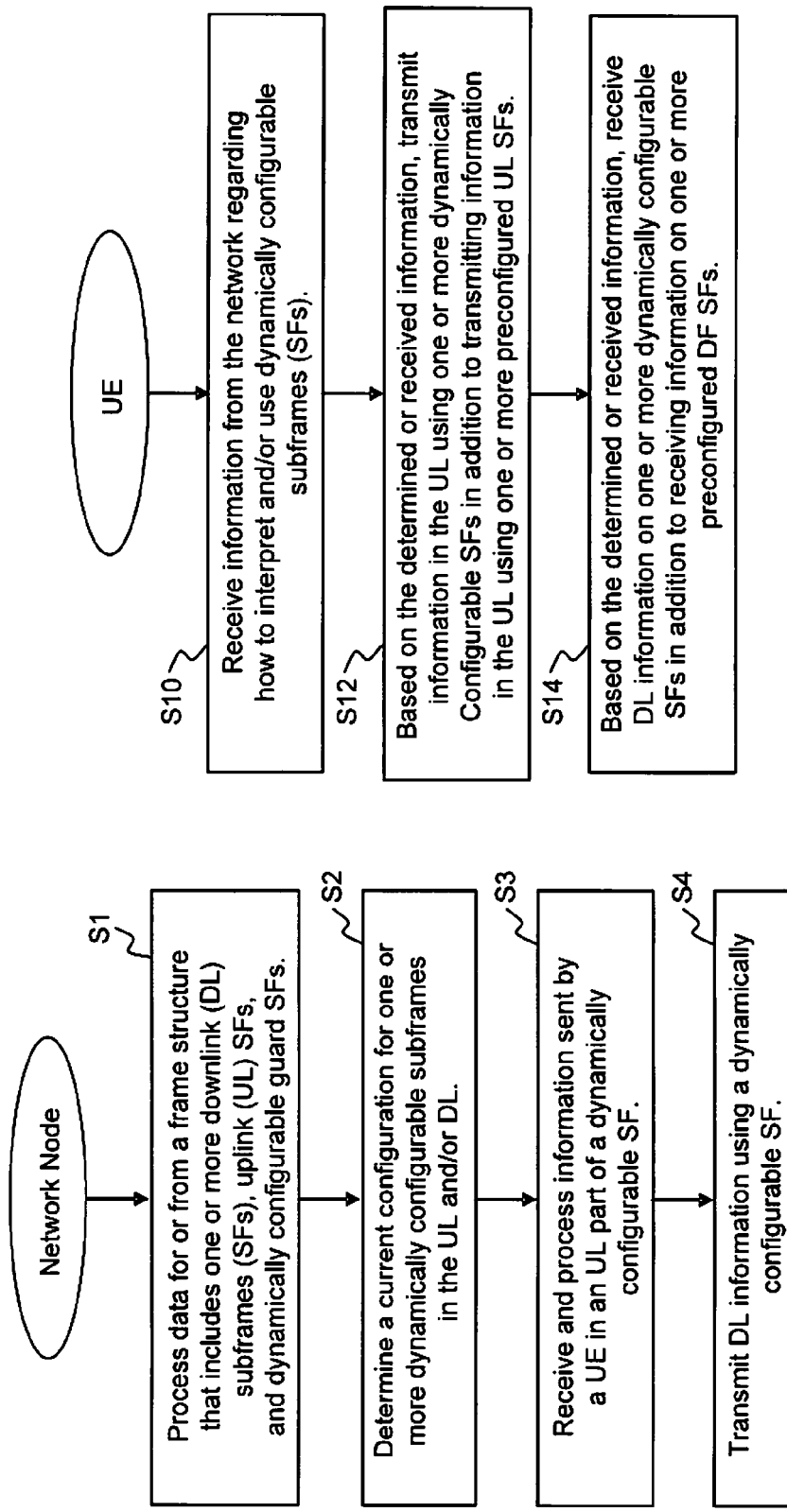
FIG. 9 is a flowchart illustrating non-limiting, example procedures for a radio network node in a communications system employing dynamically configurable guard subframes.
FIG. 10 is a flowchart illustrating non-limiting, example procedures for a UE terminal in a communications system employing dynamically configurable guard subframes.

FIG. 9 is a flowchart illustrating non-limiting, example procedures for a radio network node, e.g., a base station, in a communications system employing dynamically configurable subframes. Initially, the base station processes data for or from a frame structure family that includes one or more downlink subframes, uplink subframes, and dynamically configurable subframes, e.g., enhanced "special" subframes in LTE (step S1). The radio network node determines a current configuration for one or more dynamically configurable subframes in the uplink and/or downlink based on capacity needs in the uplink or downlink or on interference situation (step S2). The radio network node may make that determination based on subframe configuration information received from some other node in the network or even from the UE it is communicating with. For example, the subframe configuration information can be received over X2 interface. Eventually, the radio network node receives and processes information sent by a UE in an uplink part of a transmitted dynamically configurable subframe (step S3). Also eventually, the radio network node sends downlink information in a downlink part of the dynamically configurable subframe (step S4). More downlink information is typically sent in a dynamically configurable DL subframe as compared to an dynamically configurable UL subframe. Either one of steps S3 and S4 is optional depending on the application. In other words, the dynamically configurable subframe may be used for the DL data or only for the UL data in addition to using both. In the former cases, the remaining parts are preferably used to transport control information.

FIG. 10 is a flowchart illustrating non-limiting, example procedures for a UE radio terminal in a communications system that is capable of employing dynamically configurable subframes. Initially or on an ongoing basis, the UE receives information from the network (from or via a base station) regarding dynamically configurable subframes including whether DL and/or UL dynamically configurable subframes are being used and information regarding the details of the subframe configuration to use (step S10). For example, the UE needs to be informed of the length of the actual guard period, the length of the downlink part, and/or the length of the uplink part in each of the dynamically configurable UL and DL subframes. In addition, the UE may receives information if UL or DL format of the dynamically configurable subframe is used at the specific point of time. Some of the information may also be determined by the UE based on other information e.g., based on legacy special subframe format. Based on the determined and/or received information, the UE may transmit information in the uplink using one or more dynamically configurable UL subframes in addition to transmitting information in the uplink using one or more traditional uplink subframes (step S12). Also, based on the determined and/or received information, the UE may receive information in the downlink on one or more dynamically configurable DL subframes in addition to receiving information in the downlink on one or more traditional downlink subframes (step S14). It is important to note that while both dynamically configurable DL and UL subframes may be used for a UE communication, that is not necessary. In other words, a UE communication may only use dynamically configurable DL subframes or only dynamically configurable UL subframes.

Figure 3:
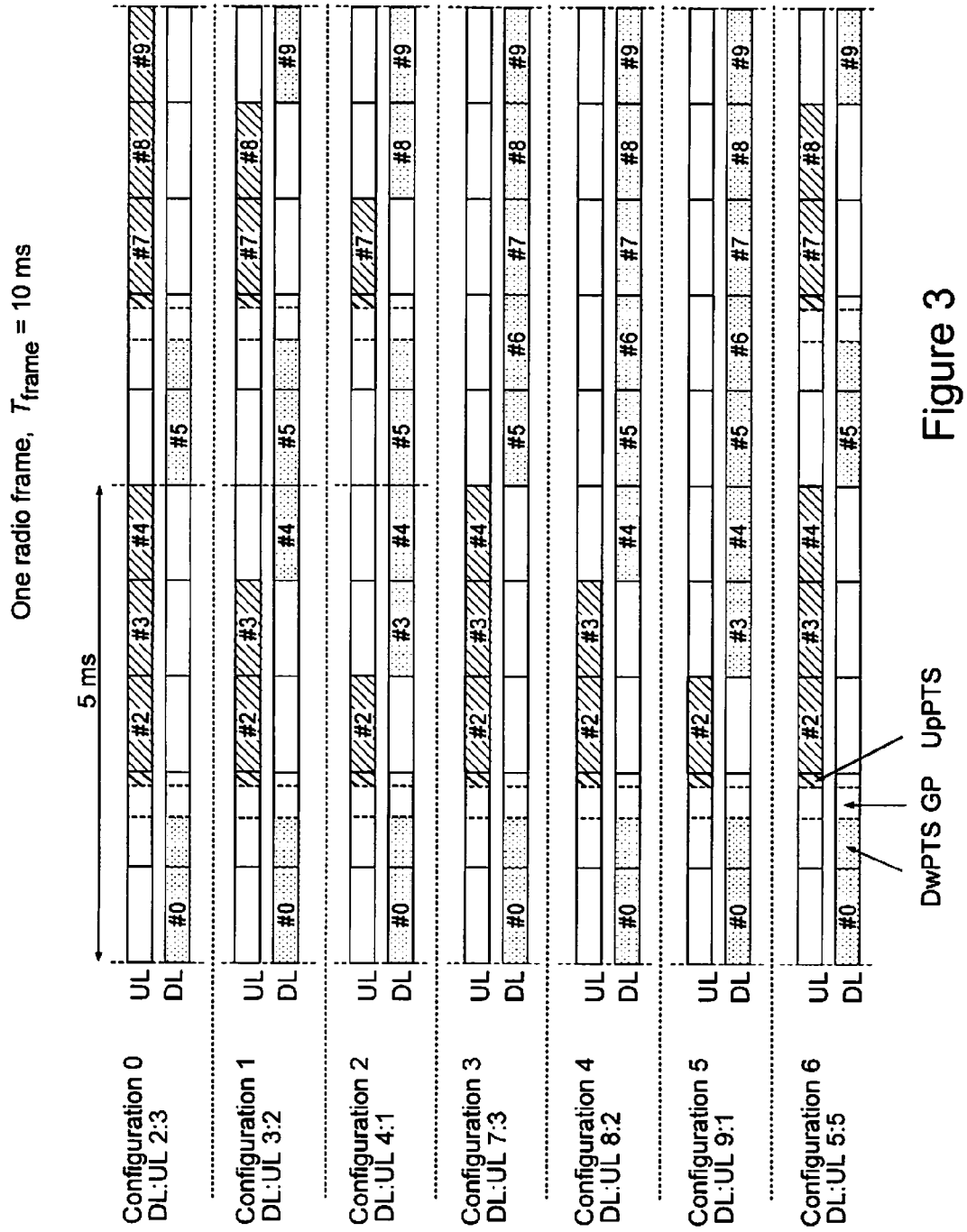
FIG. 3 is a diagram illustrating as a non-limiting example with seven different downlink/uplink configurations for time division duplex (TDD) in Long Term Evolution (LTE).
Figure 4:
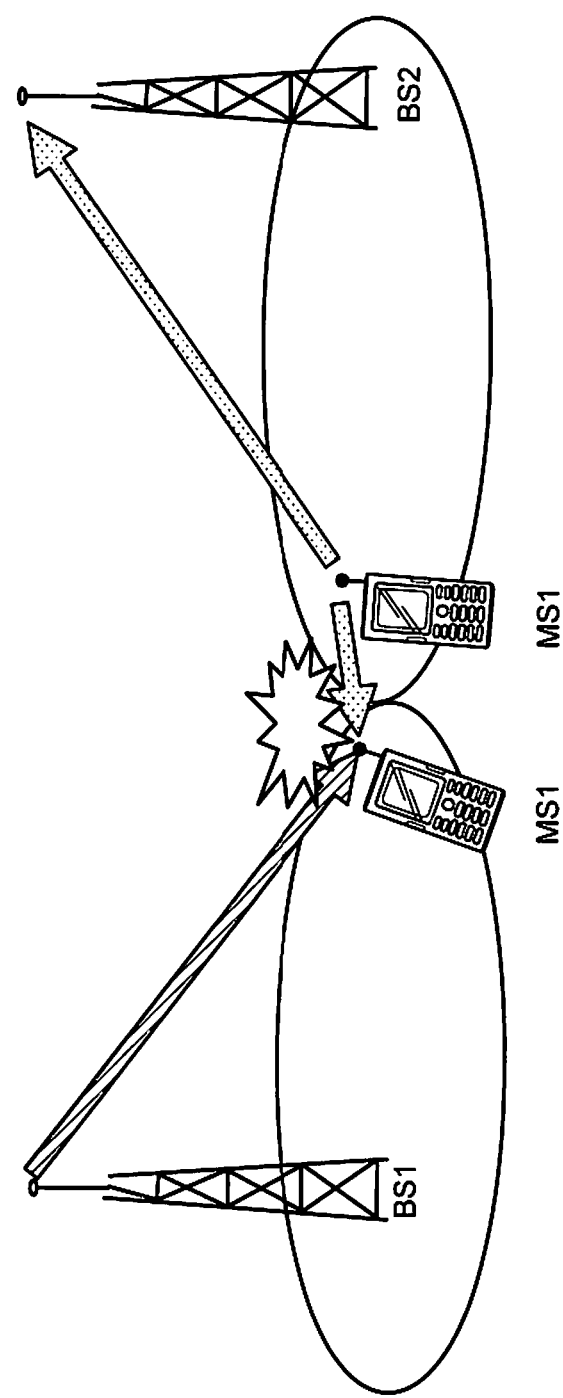
FIG. 4 illustrates an example of uplink/downlink (UL/DL) interference in time division duplex (TDD).
Figure 5:
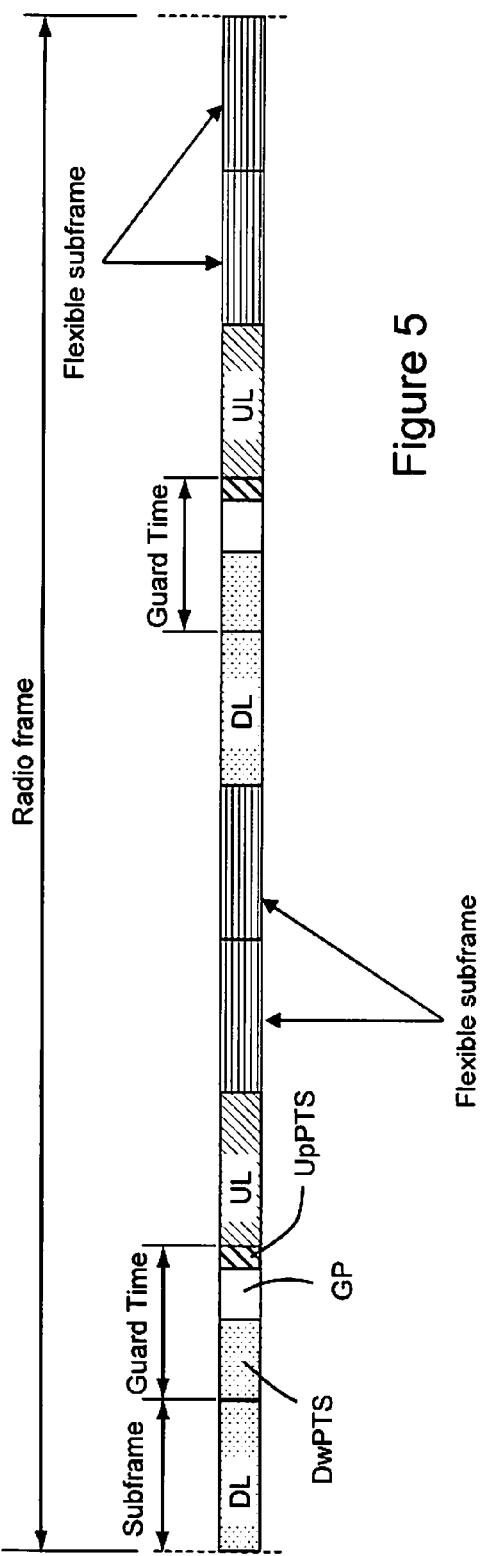
FIG. 5 illustrates a non-limiting example radio frame that includes downlink, uplink, and flexible subframes.
Figure 6:
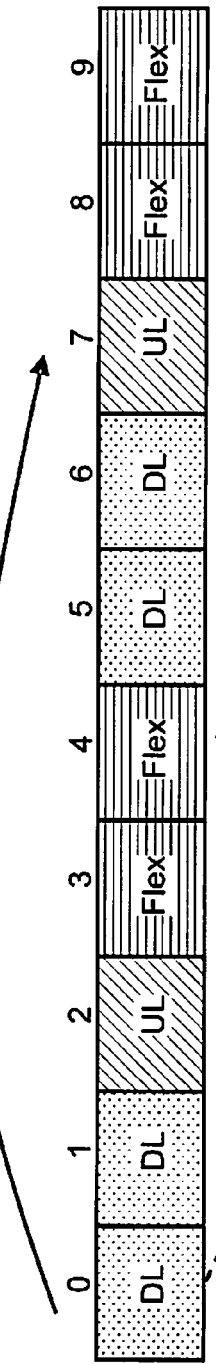
FIG. 6 is a non-limiting example illustrating HARQ feedback timing according to a secondary TDD configuration compared to a primary TDD configuration.

Legacy UEs not supporting the dynamically configurable subframes are preferably handled in a backwards compatible way. In the LTE example, an LTE special subframe configuration having a lower number of DL symbols is used as compared to the dynamically configurable subframe. For example, configurations 0 and 5 (see FIG. 3) are suitable examples. During the few DL symbols, the legacy UEs can receive control information (e.g., over the PDCCH) and potentially data information (e.g., over the PDSCH). The guard period in the legacy special subframe may be configured to a maximum length during which legacy UEs do not transmit or receive at all. An example UL period in the dynamically configurable subframe for legacy LTE UEs is 1 or 2 symbols. However, because the end of this subframe may be configured dynamically for DL use by other UEs, the network PRACH and SRS configuration is preferably such that legacy UEs do not transmit at the end of the subframe. This may be achieved in the LTE example by not configuring PRACH resources or SRS resources to the UpPTS part of the special subframe.

Referring again to FIG. 8 and the non-limiting LTE example, for the DL direction format, the enhanced special subframe starts with the DwPTS used for PDCCH and PDSCH communications. The guard period then follows, which in the illustrated example is configured to be very brief. The length of the DL part of the special subframe, DwPTS, depends on the needed guard period. As an example, if 2 symbols are needed for guard period, then the length of DwPTS is 14−2=12 symbols in the example format shown in FIG. 8. The dynamic configuration of the enhanced special subframe does not necessarily include an uplink, UpPTS, part.

For the UL format, the enhanced special subframe starts with a short DwPTS part similar to the DwPTS part of the special subframe for legacy UEs. The DwPTS is mainly used for control information, e.g., PDCCH, transmission, but it potentially may also be used for PDSCH. After the DwPTS part, there is a guard period whose length period is configurable. The end is an UpPTS part of the enhanced special subframe that depends on a currently needed and configured DwPTS and guard period. The length of the UpPTS could be 14−3−2=9 symbols in the FIG. 8 example. In contrast to the special subframe in current 3GPP LTE specifications, the UpPTS of the enhanced special subframe may be used for PUSCH transmission in addition to SRS and PRACH transmission.

Uplink control information, e.g., carried on the PUCCH, might be included or excluded from the UpPTS part. But in an example embodiment, the PUCCH is excluded because this part of the subframe may be exposed to base station (BS)-to-BS interference. If the PUCCH is excluded, then only a data part on PUSCH of the UpPTS suffers from potential interference, making it easier to control dynamically. Such control is easier because the data part, e.g., the PUSCH part of the subframe in the example, can be dynamically scheduled (or not) based on the interference situation on a per subframe basis. In contrast, when there is a PUCCH allocation used for HARQ feedback, the transmission on PUCCH depends on DL scheduling decisions.

Combinations of the DL and UL formats are also possible where a certain number of symbols greater than the number used for legacy UEs may be used for DwPTS for the DL format and a certain number of symbols greater than the number used for legacy UEs may be used for UpPTS for the UL format.

While a part of the dynamically configurable subframe information may change relatively quickly, e.g., changes every dynamically configurable subframe, another part of the dynamically configurable guard information may change more slowly, even semi-statically. A more frequently changing dynamic subframe configuration can be signaled for example on a control channel, e.g., the PDCCH in LTE, or in a MAC control element (CE). A less frequently changing dynamic subframe configuration or change can be signaled in system information on broadcast channel (SIB) or with a dedicated RRC signaling. The format of the dynamically configurable subframe can be common for all UEs in the same cell or the same geographical area, or it can vary between UEs.

In a preferred example embodiment, UEs are at least informed about the DL/UL format of a dynamically configured subframe as well as the length of the guard time period in that subframe. The UL/DL format may vary in each dynamically configurable subframe. The length of the downlink part of the dynamically configured subframe (e.g., DwPTS) and the uplink part of the dynamically configured subframe (e.g., UpPTS) can be derived from the length of downlink part for the legacy UEs. For example, if the downlink part for the legacy UEs is 3 symbols and the guard period 2 symbols, the downlink part in the dynamically configured DL subframe for enhanced UEs is 14−2=12 symbols and the uplink part in the dynamically configured UL subframe is 14−2−3=9 symbols.

As mentioned above, DL and/or UL format of the dynamically configured subframes may change rapidly on an individual subframe basis. One non-limiting example way to do this is now described. If the UE receives an UL grant for a dynamically configured subframe on a control channel, e.g., the PDCCH, in advance, then the dynamically configured subframe format is uplink; otherwise, the base station and UE assume the format is downlink in the absence of an UL grant. On the other, the length of the guard period is likely to change more slowly, and thus, a semi-static (re)configuration of the guard period length may be more appropriate.

In addition to the format and guard period length information, the following information may also be signaled to the UE: the length of the downlink part (DwPTS), the length of the uplink part (UpPTS), a RACH and reference signal (e.g., SRS) configuration, an uplink control channel (e.g., PUCCH) configuration, and other information as well.

Another aspect of the technology relates to granting UL resources of a dynamically configured UL subframe. In current LTE standards, the special subframe is not used for PUSCH, and thus, there is no UL grant timing for this subframe. One approach to this issue in the LTE example is to define new grant timing for the enhanced special subframe in LTE. The grant is signaled on a PDCCH subframe a certain number of subframes before the enhanced special UL subframe. The minimum time difference between the grant and the PUSCH transmission on the enhanced special UL subframe can correspond, for example, to a current minimum delay, e.g., 4 ms.

Figure 11:
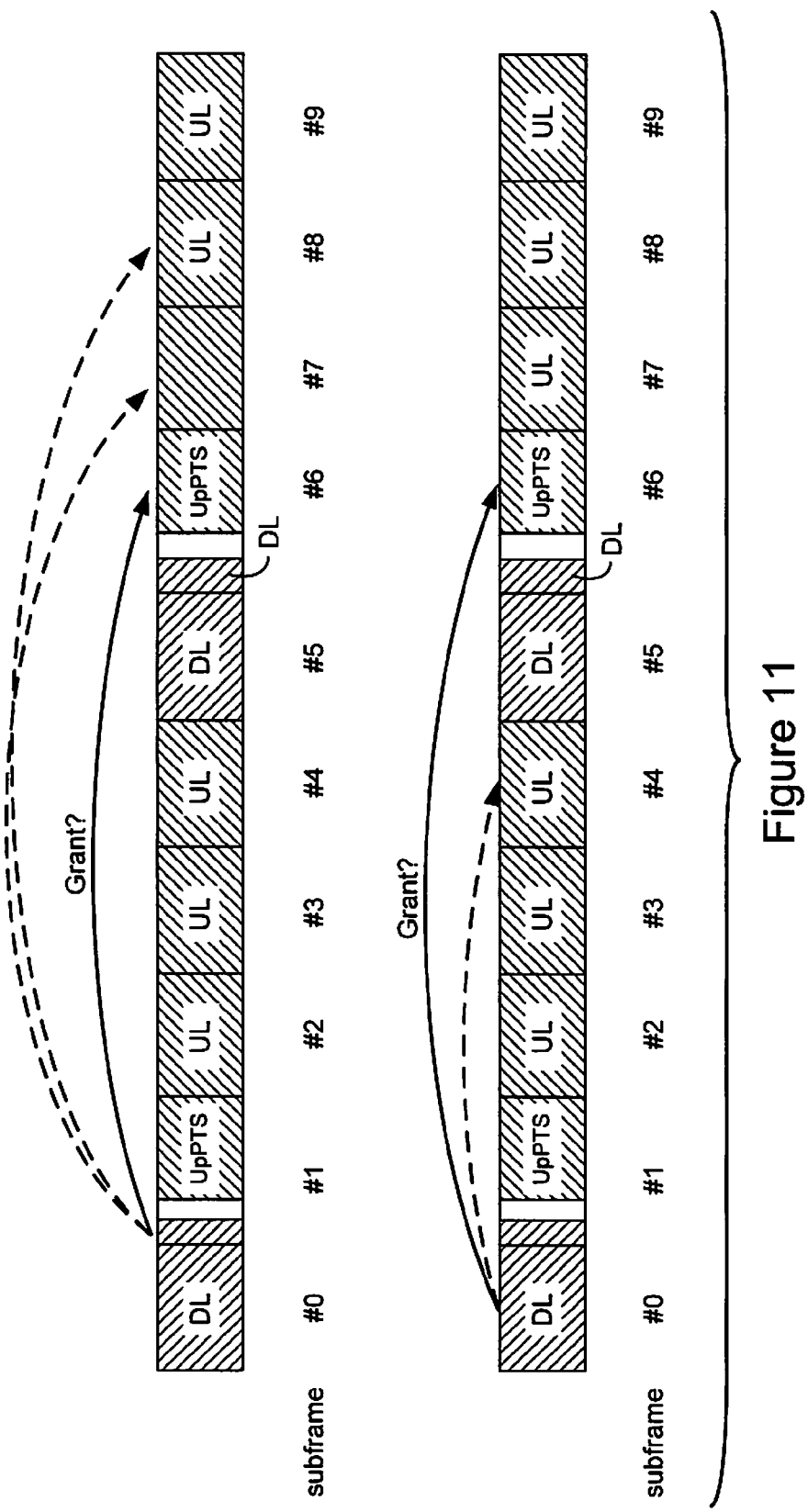
FIG. 11 are example grant timing diagrams for the special subframe with TDD configuration 0 in an LTE example.

The following description relates to the LTE example diagrams shown in FIG. 11. In a scenario when the enhanced special subframe is used with an LTE TDD configuration of 0, 1, or 2, a special subframe #1 is located more than 4 ms in advance of the next special subframe #6. In legacy TDD configuration 0, the downlink part of the special subframe #1 carries PDCCH grants already for two other subframes #7 and #8. It can be beneficial to carry a grant for an enhanced special subframe one subframe earlier to avoid a multi-transmission time interval (TTI) grant over three subframes. So while the upper alternative shows the UL grant in the latest possible PDCCH subframe #1, assuming a 4 ms minimum processing time, the lower alternative, where the grant is carried in subframe #0, may be preferred because subframe #0 currently carries only one grant.

If the TDD configuration is uplink "heavy," the PDCCH resources may be limited. In that case, one alternative is to use semi-static configuration for UL grants of the dynamically configurable subframe. Signaling can be similar to semi-persistent scheduling or with dedicated signaling with RRC. But even if the grant format is signaled semi-statistically, the UL/DL format for the dynamically configurable subframe can be signaled more rapidly and dynamically, e.g., with a one bit indication occurring at least 4 ms in advanced of the dynamically configurable subframe.

Figure 12:
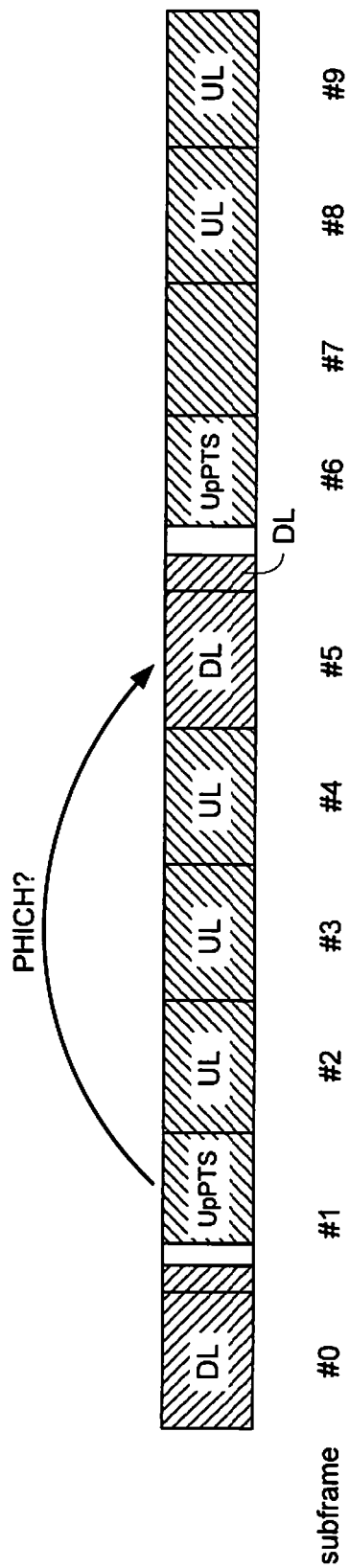
FIG. 12 is an example of HARQ feedback timing for PUSCH transmission in an enhanced special subframe in an LTE example.

Introducing uplink, e.g., PUSCH in LTE, transmission for the dynamically configured subframe means that new HARQ feedback timing needs to be introduced. Hybrid ARQ feedback is transmitted as a response to data transmission in the opposite direction, i.e., in DL PHICH in case of PUSCH transmission. Currently, UL HARQ timing is not available in LTE for the legacy special subframe since PUSCH transmission is not possible in that subframe. One approach for the enhanced special subframe in the non-limiting LTE example is to send a pilot signal over a pilot channel, e.g., PHICH, for PUSCH transmission of the enhanced special subframe in a closest legacy DL subframe at least 4 ms before the UL transmission. FIG. 12 provides an illustration of example HARQ feedback timing for PUSCH transmission in an enhanced special subframe in the non-limiting LTE example.

The enhanced special subframe also requires new technology regarding transport block size in the LTE example. The number of PUSCH symbols in the enhanced special subframe in the LTE example is smaller than the number of symbols in a normal UL LTE subframe. Also, the number of symbols for DwPTS for the enhanced special subframe is different compared to legacy special subframes. Thus, the transport block sizes currently defined in 3GPP TS 36.213 are not suitable for the enhanced special subframe. But instead of specifying new transport block sizes, one approach is to scale the current transport block size tables in 3GPP TS 36.213, the contents of which are incorporated here by reference. The UE calculates the number of symbols used for PUSCH/PDSCH in the enhanced special subframe and then either scales the number of the bits in the current 3GPP transport block size tables or scales the number of resource blocks used in the determination of the transport block size. For example, if the number of PUSCH/PDSCH symbols in the enhanced special subframe is 9, then the existing transport block (TB) sizes or the number of resource blocks is scaled with factor 9/14 in the current LTE example.

Another aspect of the technology relates to a reference signal structure, i.e., the location of reference symbols in time and frequency, for the dynamically configured subframe. In one example embodiment, a new reference signal structure, which is different as currently used in LTE, may be employed for the downlink part of the dynamically configured subframe. One example is the removal of cell-specific reference signals in the enhanced special subframe in the non-limiting LTE example. Alternatively, an existing uplink reference signal structure may be changed. For example, the reference signals may be moved in time to other symbols or may be made sparser in frequency and/or time, meaning that there are less reference symbols in a subframe.

Figure 13:
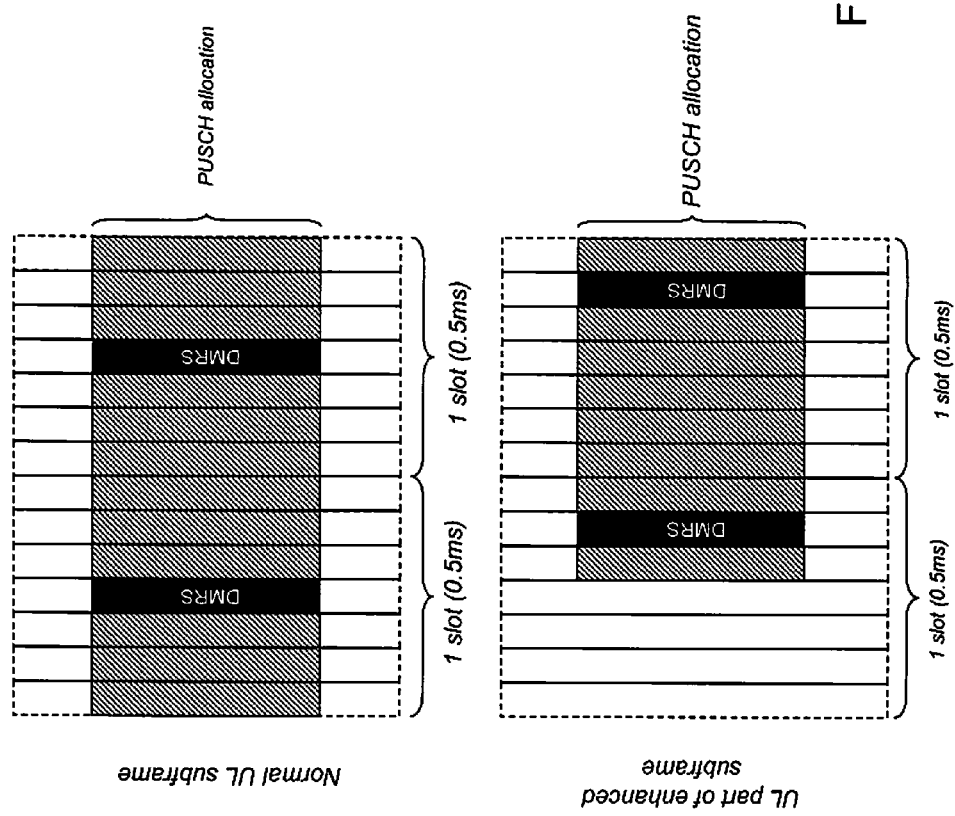
FIG. 13 is a non-limiting example of demodulation reference signal transmission in the enhanced special subframe in an LTE example.

In another example embodiment, the symbol slot format for uplink data is created from the normal uplink subframe format by puncturing symbols (e.g., SC-FDMA symbols in the LTE example) at the end and/or beginning of the subframe combined with shifting the symbol positions in time. Consider the following LTE example. For the case with normal cyclic prefix, a normal UL subframe includes two slots with seven SC-FDMA symbols each. The center symbol in each slot is a known demodulation reference signal and other SC-FDMA symbols can be used for data transmission. An example where two symbols are punctured at the end and at the beginning of the subframe together with a shift of four symbols is shown in FIG. 13. That figure shows an example of a demodulation reference signal (DMRS) transmission in an enhanced special subframe.

Figure 14A:
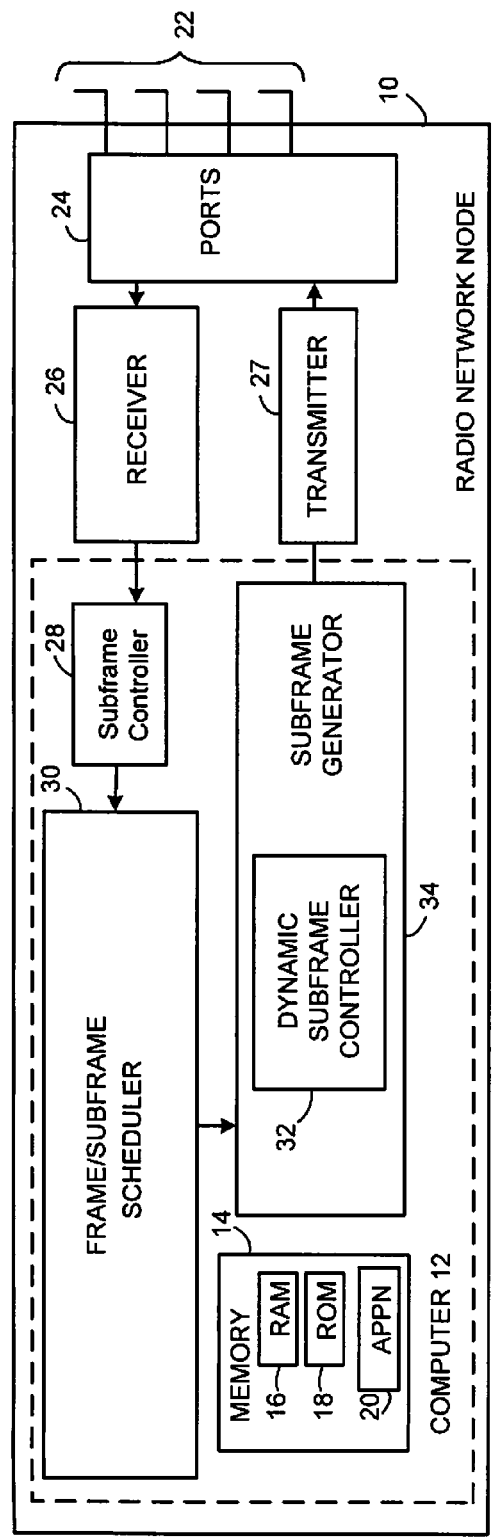
FIGS. 14A and 14B are non-limiting example function block diagrams of a base station and a UE terminal for use in a communications network in which dynamically configurable guard subframes as described herein or encompassed hereby can be utilized.

FIG. 14A shows an example radio network node 10 in which dynamically configured guard subframes as described herein or encompassed hereby can be utilized. The radio network node 10 communicates with one or more UE radio terminals 40 over an air interface and includes a frame/subframe scheduler 30 which controls operation of a subframe generator 34. The subframe generator 34 includes a dynamic subframe controller 32 which dynamically (re)configures one or more downlink and/or uplink subframes according to one or more of the non-limiting example embodiments described above. The subframe generator 34 is configured to configure and format subframes which are used to transmit downlink data from the radio network node 10 to the UE radio terminal 40 as well as uplink data from the UE radio terminal to the radio network node. In conjunction with the dynamic subframe controller 32, the frame/subframe scheduler 30 configures and formats downlink/uplink subframes, and controls signaling so that both the radio network node and the UE radio terminal understand the dynamic configuration of one or more downlink and/or uplink subframes.

The radio network node also includes typical radio network node hardware like transmitter 27 and antennas 22 connected to the radio network node via antenna ports 24. Received signals are processed in a receiver 26 to convert the received signal to baseband. A subframe controller 28 extracts frames from the received baseband signal for processing by the frame/subframe scheduler 30. The subframe controller 28, frame/subframe scheduler 30, dynamic subframe controller 32, and subframe generator 34 can be computer-implemented, e.g., by one or more processor(s) or controller(s). A computer 12 is shown with a memory 14 that includes RAM 16, ROM 18, and application programs 20. The functions of the computer 12 may be implemented using other types of suitably configured electronic circuitry.

Figure 14B:
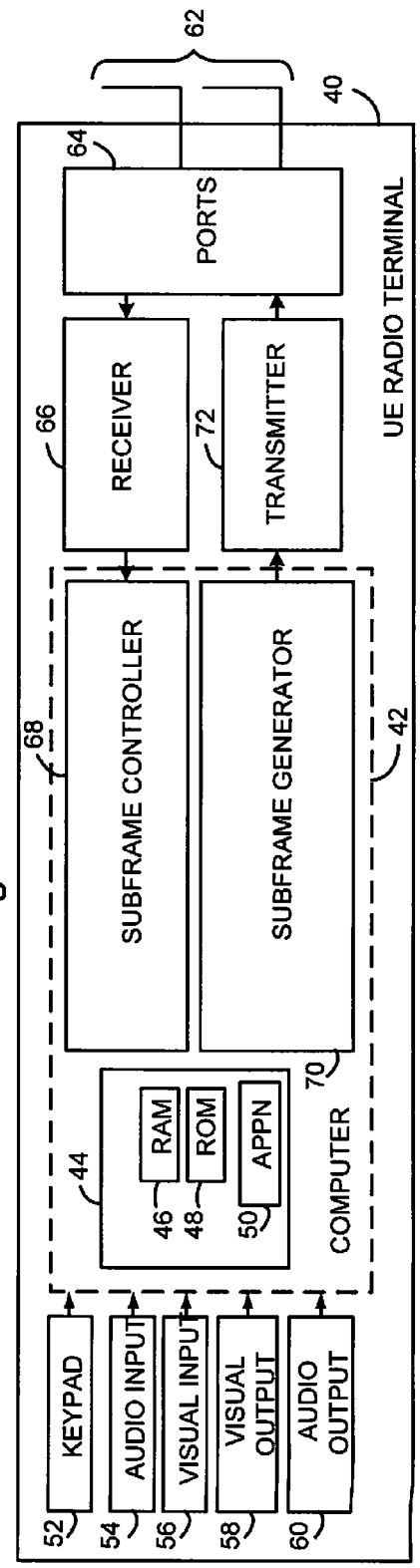

The UE radio terminal 40 in FIG. 14B includes a subframe generator 70 so that UE radio terminal 40 can generate transmissions of subframes on the uplink (UL) for those frames which are understood to be uplink (UL) subframes, either by semi-permanent designation, or to be dynamically configurable guard subframes which are understood from received control information or signaling or otherwise are to be used for uplink (UL) transmission. The subframes from the subframe generator 70 are provided to transmitter 72 to convert the baseband information into an RF signal which is routed via one or more port 64 to one or more antennas 62 for transmission over the air interface to the radio network node 10. Downlink signals are received via the one or more antennas 62 and conveyed via the one or more ports 64 to receiver 66 that converts the RF signal into baseband. The baseband signal is then provided to subframe controller 68 for downlink subframe processing in accordance with preconfigured downlink subframes and those dynamically configurable subframes designated or assumed to be downlink dynamically configurable subframes.

The subframe controller 68 and subframe generator 70 can be computer-implemented, e.g., by one or more processor(s) or controller(s). A computer 42 is shown with a memory 44 that includes RAM 46, ROM 48, and application programs 50. The functions of the computer 42 may be implemented using other types of suitably configured electronic circuitry. The UE radio terminal may also include typical user interface components like a keypad 52, audio input 54, visual input 56, visual output 58, and audio output 60.

The technology described above provides dynamic downlink/uplink radio resource allocation in a TDD-based communications system. More uplink and downlink radio resources are made available in a dynamically configurable guard subframe that is also backwards compatible for legacy UEs. Furthermore, by not transmitting control signaling in the dynamically configurable guard subframe, the technology offers robustness with respect to remote base station interference.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described here, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A radio network node for use in a radio communications network using time division duplex (TDD) to communicate with user equipment (UE) radio terminals, comprising:
   electronic circuitry configured to:
      process data for a frame structure that includes one or more subframes preconfigured as a downlink subframe, one or more subframes preconfigured as an uplink subframe, and one or more dynamically configurable subframes, each dynamically configurable subframe including a guard time period and at least a configurable downlink and an uplink format, wherein the downlink format includes more downlink resources than the uplink format and wherein the configurable downlink format and/or the configurable uplink format does not overlap with a legacy UEs DwPTs part and thus, the dynamically configurable subframe is backwards compatible with the legacy UEs not capable of processing the dynamically configurable subframe;
      determine a configuration for one or more dynamically configurable subframes by determining an uplink/downlink format of the dynamically configured subframe and to dynamically change an amount of uplink resources and/or downlink resources on an individual subframe basis for the dynamically configured subframe based on the determined uplink/downlink format;
   radio receive circuitry; and
   radio transmit circuitry configured to:
      signal information about the determined configuration for one or more dynamically configurable subframes to the user equipment radio terminals on a control channel; and
      transmit information in a downlink part of dynamically configurable subframes.

2. The radio network node in claim 1, wherein one or more of the dynamically configurable subframes includes an uplink part for transporting a dynamically configurable amount of uplink information, and wherein the electronic processing circuitry is configured to determine a configuration for the one or more dynamically configurable subframes that includes an uplink part.

3. The radio network node in claim 2, wherein the configurable downlink part transports at least control information, and wherein the configurable uplink part transports data information, reference information, and random access information.

4. The radio network node in claim 1, wherein the radio receive circuitry is configured to receive information in an uplink part of a dynamically configurable subframe transmitted by a UE.

5. The radio network node in claim 4, wherein the electronic circuitry is configured to determine hybrid automatic repeat request, HARQ, feedback timing in response to data transmission in the uplink part of the dynamically configurable subframe.

6. The radio network node in claim 4, wherein the uplink information transported in the dynamically configurable subframe includes uplink data information but not control information.

7. The radio network node in claim 1, wherein the radio network is an LTE network, and wherein the dynamically configurable subframe is an enhancement of the special subframe in LTE.

8. A method for a radio network node for use in a radio communications network that uses time division duplex (TDD) to communicate with user equipment (UE) radio terminals, the method comprising:
   processing data for a frame structure that includes one or more subframes preconfigured as a downlink subframe, one or more subframes preconfigured as an uplink subframe, and one or more dynamically configurable subframes, each dynamically configurable subframe including a guard time period and at least a configurable downlink and an uplink format, wherein the downlink format includes more downlink resources than the uplink format, wherein the configurable downlink format and/or the configurable uplink format does not overlap with a legacy UEs DwPTs part and thus, the dynamically configurable subframe is backwards compatible with the legacy UEs not capable of processing the dynamically configurable subframe;
   determining a configuration for one or more dynamically configurable subframes by determining an uplink/downlink format of the dynamically configured subframe and to dynamically change an amount of uplink resources and/or downlink resources on an individual subframe basis for the dynamically configured subframe based on the determined uplink/downlink format;
   signalling information about the determined configuration for one or more dynamically configurable subframes to the user equipment radio terminals on a control channel; and
   transmitting information in downlink parts of the one or more dynamically configurable subframes.

9. The method in claim 8, wherein one or more of the dynamically configurable subframes includes an uplink part for transporting a dynamically configurable amount of uplink information, and the method further comprises:

determining a configuration for the one or more dynamically configurable subframes that includes an uplink part.

10. The method in claim 9, wherein the configurable downlink part transports at least control information, and wherein the configurable uplink part transports data information, reference information, and random access information.

11. The method in claim 8, further comprising receiving data in an uplink part of the dynamically configurable subframe transmitted by the UE.

12. The method in claim 11, wherein uplink information transported in the dynamically configurable subframe includes uplink data information but not control information.

13. A user equipment (UE) radio terminal configured to communicate with a radio communications network using time division duplex (TDD), comprising:
a radio receive circuitry configured to:
receive information, on a control channel, about the determined configuration for one or more dynamically configurable subframes from the radio communications network, wherein the dynamically configurable subframes has a frame structure that includes one or more subframes preconfigured as a downlink subframe, one or more subframes preconfigured as an uplink subframe, and one or more dynamically configurable subframes, each dynamically configurable subframe including a guard time period and at least a configurable downlink and an uplink format, wherein the downlink format includes more downlink resources than the uplink and wherein the configurable downlink format and/or the configurable uplink format does not overlap with a legacy UEs DwPTs part and thus, the dynamically configurable subframe is backwards compatible with the legacy UEs not capable of processing the dynamically configurable subframe;
determine a configuration for one or more dynamically configurable subframes based on the received information by determining an uplink/downlink format of the dynamically configured subframe and to dynamically change an amount of uplink and/or downlink resources on an individual subframe basis for the dynamically configured subframe based on the determined uplink/downlink format; and
receive information in a downlink part of a dynamically configurable subframe, and
a radio transmit circuitry configured to transmit information.

14. The UE radio terminal in claim 13, wherein one or more of the dynamically configurable subframes includes an uplink part for transporting a variable amount of uplink information, the radio transmit circuitry is configured to transmit information in the uplink part of a dynamically configurable subframe, and the electronic processing circuitry is configured to determine a configuration for the one or more dynamically configurable subframes that an includes an uplink part.

15. The UE radio terminal in claim 14, wherein the electronic circuitry is configured to process hybrid automatic repeat request, HARQ, feedback timing associated with data transmission in a dynamically configurable subframe.

16. The UE radio terminal in claim 14, wherein the uplink information transported in the dynamically configurable subframe includes uplink data information but not control information.

17. The UE radio terminal in claim 14, wherein the configurable downlink part transports at least control information, and wherein the configurable uplink part transports data information, reference information, and random access information.

18. The UE radio terminal in claim 13, wherein the radio network is an LTE network, and wherein the dynamically configurable subframe is an enhancement of the special subframe in LTE.

19. A method for communicating using subframes in a radio communications network that uses time division duplex (TDD) communications between a radio network node and a user equipment (UE) radio terminal, comprising the UE radio terminal performing the steps of:
receiving information, on a control channel, about the determined configuration for one or more dynamically configurable subframes from the radio communications network, wherein the dynamically configurable subframes has a frame structure that includes one or more subframes preconfigured as a downlink subframe, one or more subframes preconfigured as an uplink subframe, and one or more dynamically configurable subframes, each dynamically configurable subframe including a guard time period and at least a configurable downlink and an uplink format, wherein the downlink format includes more downlink resources than the uplink, wherein the configurable downlink format and/or the configurable uplink format does not overlap with a legacy UEs DwPTs part and thus, the dynamically configurable subframe is backwards compatible with the legacy UEs not capable of processing the dynamically configurable subframe;
determining a configuration for one or more dynamically configurable subframes based on the received information by determining an uplink/downlink format of the dynamically configured subframe and to dynamically change an amount of uplink and/or downlink resources on an individual subframe basis for the dynamically configured subframe based on the determined uplink/downlink format; and
receiving information in a downlink part of a dynamically configurable subframe.

20. The method in claim 19, wherein one or more of the dynamically configurable subframes includes an uplink part for transporting a variable amount of uplink information, and the method further comprises:
determining a configuration for the one or more dynamically configurable subframes that includes an uplink part, and
transmitting information in the uplink part of a dynamically configurable subframe.

21. The method in claim 20, wherein the uplink information transported in the uplink part of the dynamically configurable subframe includes uplink data information but not control information.

22. The method in claim 20, wherein the configurable downlink part transports at least control information, and wherein the configurable uplink part transports data information, reference information, and random access information.

23. The method in claim 19, wherein the radio network is an LTE network, and wherein the dynamically configurable subframe is an enhancement of the special subframe in LTE.

* * * * *